United States Patent [19]

Katz

[11] Patent Number: 5,566,869

[45] Date of Patent: Oct. 22, 1996

[54] ARM SUPPORTED DRINKING CONTAINER

[76] Inventor: Adam J. Katz, 11231 Rocking Horse Rd., Cooper City, Fla. 33026

[21] Appl. No.: 494,326

[22] Filed: Jun. 26, 1995

[51] Int. Cl.$^6$ ........................................................ A45F 5/00
[52] U.S. Cl. ...................... 224/148.6; 224/222; 224/267; 224/148.2; 224/148.5; 137/516.11; 137/539; 222/175; 222/496; 222/482; 222/529
[58] Field of Search ...................................... 224/148, 219, 224/222, 224, 240, 907, 267; 222/175, 495, 496, 481, 482, 529; 128/200.28, 201.28, 207.12, 207.16; 137/516.11, 539; 215/11.5, 19, 311, 312, 315

[56] References Cited

U.S. PATENT DOCUMENTS

| | | | |
|---|---|---|---|
| 4,090,650 | 5/1978 | Gotta | 224/148 |
| 4,898,291 | 2/1990 | Sailors | 215/11.5 |
| 4,917,280 | 4/1990 | Schneider | 224/224 |
| 5,060,833 | 10/1991 | Edison et al. | 224/148 |
| 5,065,790 | 11/1991 | Kornas | 137/539 |
| 5,131,576 | 7/1992 | Turnipseed | 224/907 |

FOREIGN PATENT DOCUMENTS

| | | | |
|---|---|---|---|
| 62028 | 10/1982 | European Pat. Off. | 224/148 |
| 2684854 | 6/1993 | France | 224/224 |
| 740193 | 11/1955 | United Kingdom | 137/539 |

*Primary Examiner*—Henry J. Recla
*Assistant Examiner*—Gregory M. Vidovich

[57] ABSTRACT

A container for supporting a quantity of fluid relative to a limb of an individual. The inventive device includes a container having an arcuate inner side wall positionable along an exterior of a human limb. A plurality of securing straps extend from opposed sides of the container for securing about the limb to mount the container thereto. A dispensing valve is mounted relative to the container to permit dispensing of fluid therefrom during a physical activity.

4 Claims, 3 Drawing Sheets

ARM SUPPORTED DRINKING CONTAINER

BACKGROUND OF THE INVENTION

1. Field of the Invention

The present invention relates to container structures and more particularly pertains to an arm supported drinking container for supporting a quantity of fluid relative to a limb of an individual.

2. Description of the Prior Art

The use of container structures is known in the prior art. More specifically, container structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art container structures include U.S. Pat. No. 5,301,858; U.S. Pat. No. 5,167,354; U.S. Pat. No. 5,244,114; U.S. Pat. No. 5,104,008; U.S. Pat. No. 4,955,572; and U.S. Design Pat. No. 330,993.

While these devices fulfill their respective, particular objectives and requirements, the aforementioned patents do not disclose a arm supported drinking container for supporting a quantity of fluid relative to a limb of an individual which includes a container having an arcuate inner side wall positionable along an exterior of a human limb, a plurality of securing straps extending from opposed sides of the container for securing about the limb to mount the container relative thereto, and a dispensing valve mounted relative to the container for permitting dispensing of fluid therefrom during a physical activity.

In these respects, the arm supported drinking container according to the present invention substantially departs from the conventional concepts and designs of the prior art, and in so doing provides an apparatus primarily developed for the purpose of supporting a quantity of fluid relative to a limb of an individual.

SUMMARY OF THE INVENTION

In view of the foregoing disadvantages inherent in the known types of container structures now present in the prior art, the present invention provides a new arm supported drinking container construction wherein the same can be utilized for supporting a quantity of fluid relative to an individual's arm. As such, the general purpose of the present invention, which will be described subsequently in greater detail, is to provide a new arm supported drinking container apparatus and method which has many of the advantages of the container structures mentioned heretofore and many novel features that result in a arm supported drinking container which is not anticipated, rendered obvious, suggested, or even implied by any of the prior art container structures, either alone or in any combination thereof.

To attain this, the present invention generally comprises a container for supporting a quantity of fluid relative to a limb of an individual. The inventive device includes a container having an arcuate inner side wall positionable along an exterior of a human limb. A plurality of securing straps extend from opposed sides of the container for securing about the limb to mount the container thereto. A dispensing valve is mounted relative to the container to permit dispensing of fluid therefrom during an activity.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new arm supported drinking container apparatus and method which has many of the advantages of the container structures mentioned heretofore and many novel features that result in a arm supported drinking container which is not anticipated, rendered obvious, suggested, or even implied by any of the prior art container structures, either alone or in any combination thereof.

It is another object of the present invention to provide a new arm supported drinking container which may be easily and efficiently manufactured and marketed.

It is a further object of the present invention to provide a new arm supported drinking container which is of a durable and reliable construction.

An even further object of the present invention is to provide a new arm supported drinking container which is susceptible of a low cost of manufacture with regard to both materials and labor, and which accordingly is then susceptible of low prices of sale to the consuming public, thereby making such arm supported drinking containers economically available to the buying public.

Still yet another object of the present invention is to provide a new arm supported drinking container which provides in the apparatuses and methods of the prior art some of the advantages thereof, while simultaneously overcoming some of the disadvantages normally associated therewith.

Still another object of the present invention is to provide a new arm supported drinking container for supporting a quantity of fluid relative to a limb of an individual.

Yet another object of the present invention is to provide a new arm supported drinking container which includes a container having an arcuate inner side wall positionable along an exterior of a human limb, a plurality of securing straps extending from opposed sides of the container for securing about the limb to mount the container relative thereto, and a dispensing valve mounted relative to the container for permitting dispensing of fluid therefrom during a physical activity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
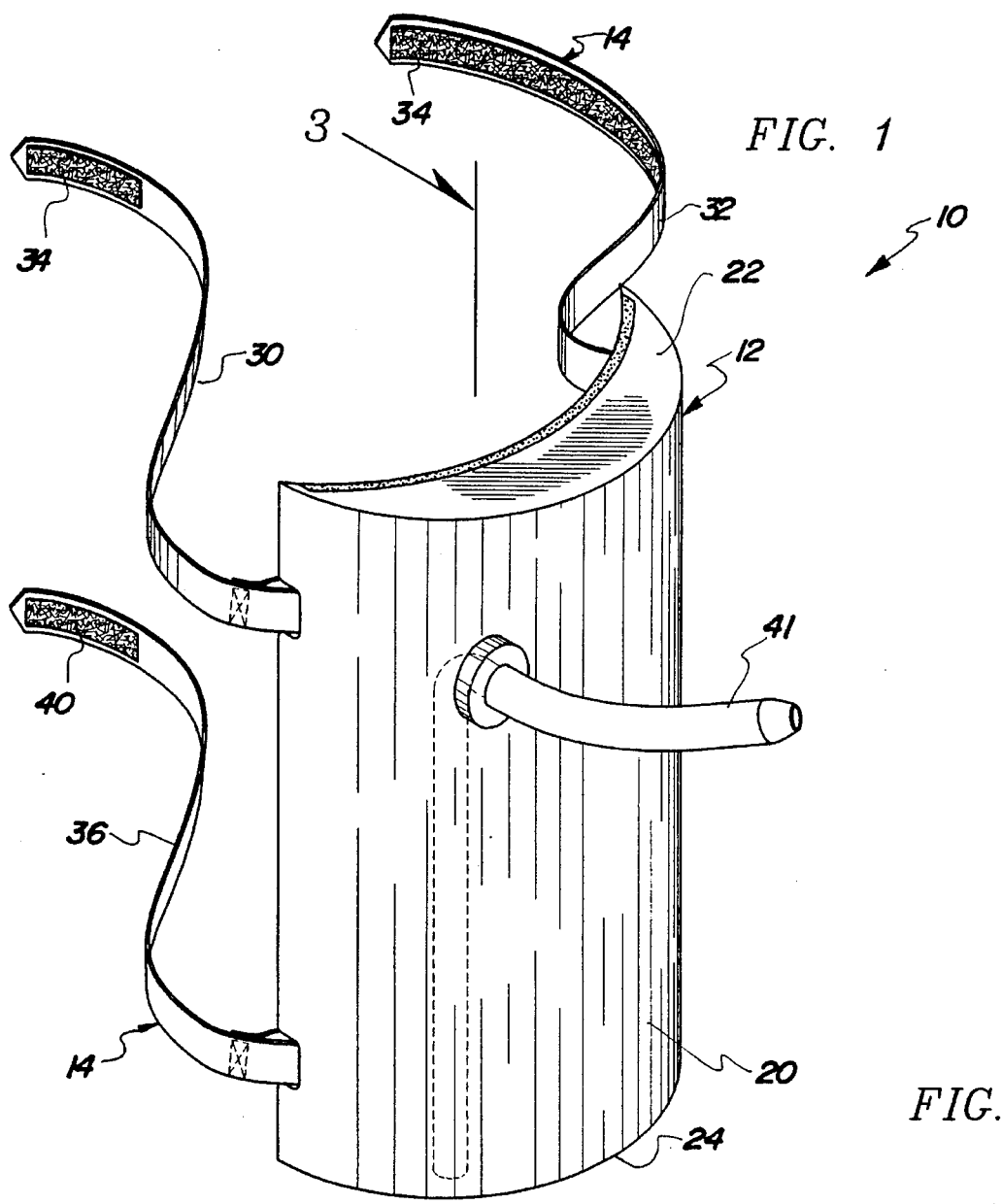
FIG. 1 is an isometric illustration of an arm supported drinking container according to the present invention.

With reference now to the drawings, and in particular to FIGS. 1–6 thereof, a new arm supported drinking container embodying the principles and concepts of the present invention and generally designated by the reference numeral 10 will be described.

More specifically, it will be noted that the arm supported drinking container 10 comprises a container 12 positionable against an exterior surface of a limb or arm of an individual during use of the device 10. A securing means 14 extends from the container 12 for circumferentially positioning about the wearer's limb so as to secure the container 12 relative thereto. A dispensing valve 16 (see FIGS. 5 and 6) is mounted relative to the container 12 and positioned in fluid communication with an interior of the container so as to permit selective dispensing of fluid therefrom for consumption by an individual wearing the device. By this structure, the container 12 can be supported relative to a limb of an individual, whereby such individual may consume fluid positioned within the container 12 as desired during a physical activity.

Figure 2:
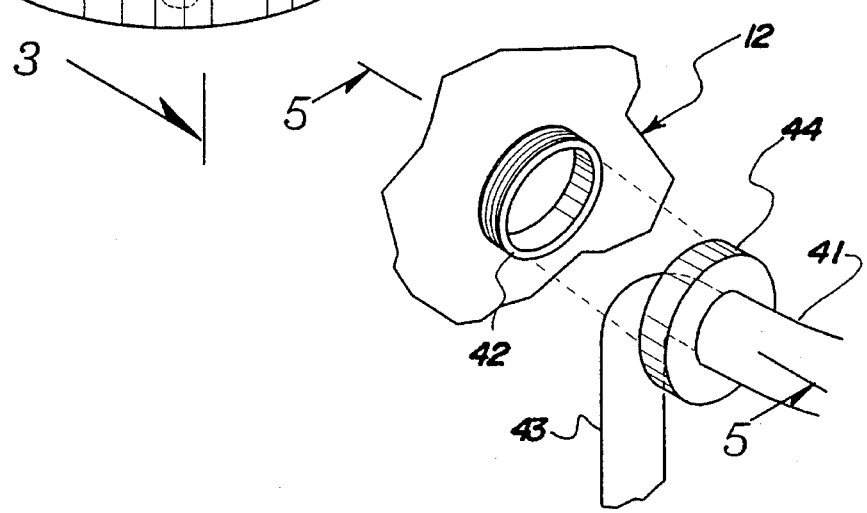
FIG. 2 is an exploded isometric illustration of a portion of the present invention.
Figure 3:
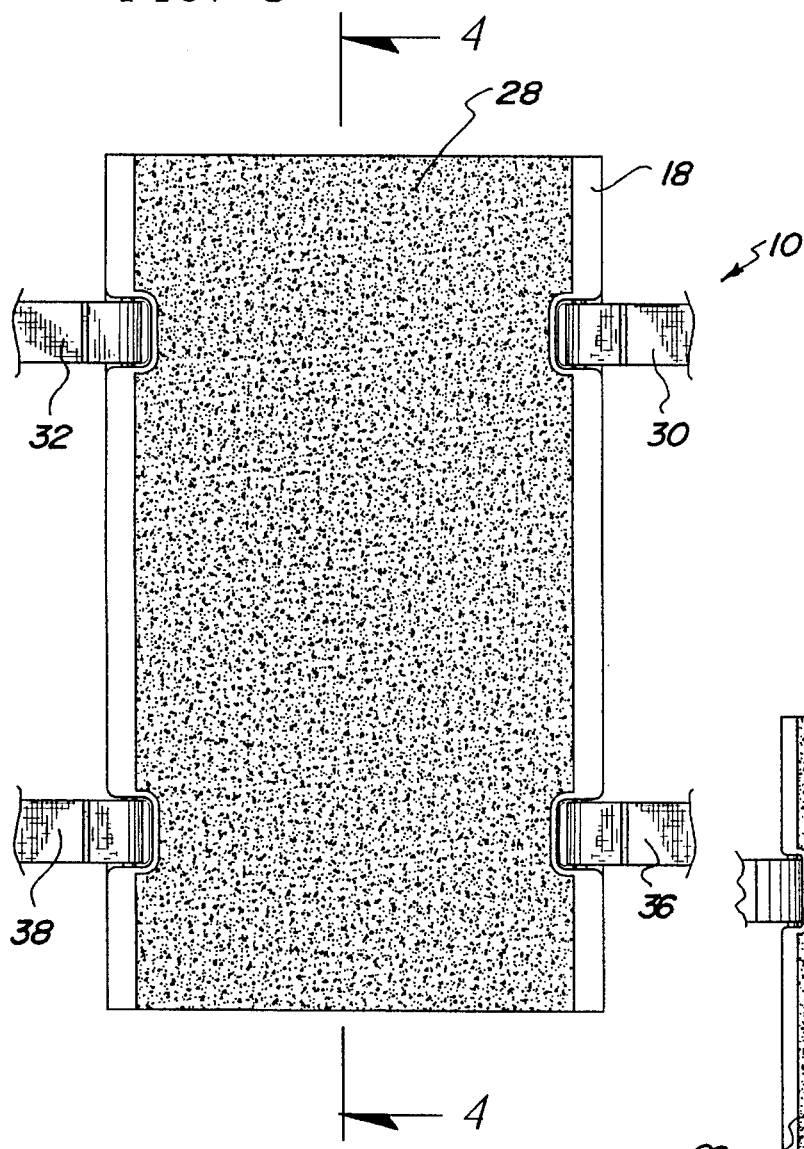
FIG. 3 is a rear elevation view of the invention taken from line 3—3 of FIG. 1.
Figure 4:
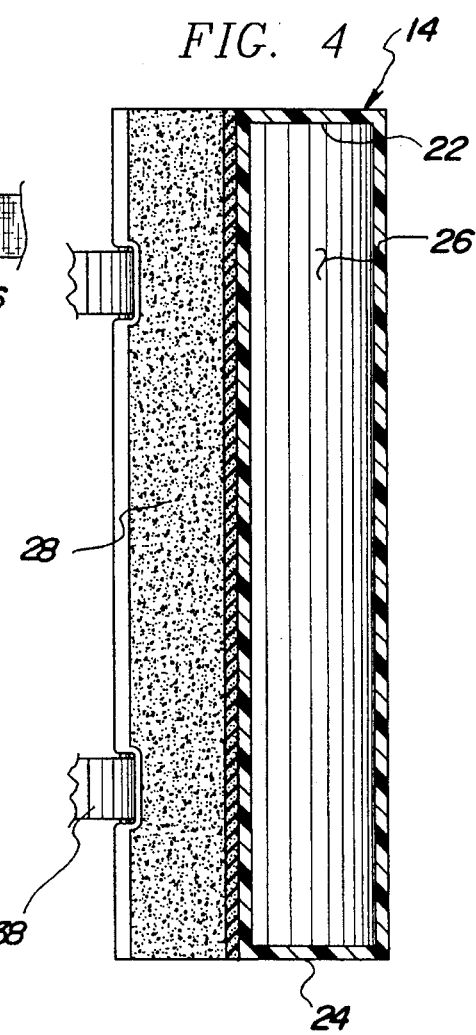
FIG. 4 is a cross sectional view taken along line 4—4 of FIG. 3.

As best illustrated in FIGS. 1 through 4, it can be shown that the container 12 according to the present invention 10 preferably comprises an arcuate inner side wall 18 having a first radius of curvature and opposed longitudinal edges extending in a substantially parallel and spaced orientation. An outer side wall 20 having a second radius of curvature substantially less than the first radius of curvature similarly includes opposed longitudinal edges extending in a substantially spaced and parallel orientation. The longitudinal edges of the inner side wall 18 are integrally or otherwise sealingly secured to the longitudinal edges of the outer side wall 20 so as to define a substantially crescent cross-sectional shape of the container 12. A top wall 22 extends substantially orthogonally between upper edges of the inner side wall 18 and the outer side wall 20. A bottom wall 24 similarly extends substantially orthogonally between the bottom edges of the inner side wall 18 and the outer side wall 20 so as to complete a definition of the container 12. By this structure, fluids or like flowable materials can be positioned within the hollow interior 26 of the container 12 as illustrated in FIG. 4 of the drawings. To provide for comfortable engagement of the inner side wall 18 against an exterior surface of a human limb, an engaging pad 28 is desirably secured to an interior surface of the inner side wall 18 as shown in FIGS. 3 and 4 of the drawings. The engaging pad 28 is preferably constructed of a substantially resilient polymeric material or foam conventionally known.

With continuing reference to FIGS. 1 through 4, it can be shown that the securing means 14 of the present invention 10 preferably comprises a pair of upper straps and a pair of lower straps extending from opposed sides of the container 12 which can be extended about a limb of an individual so as to secure the device 10 relative thereto. To this end, the upper straps comprise a first upper strap 30 secured to a first longitudinal edge of the container 12, and a second upper strap 32 secured to a second longitudinal edge of the container. Hook and loop material 34 is secured to the upper straps 30 and 32 so as to permit selective coupling of the first upper strap 30 to the second upper strap 32 when positioned about an arm of an individual. Similarly, the lower straps comprise a first lower strap 36 coupled to a first longitudinal edge of the container 12 and a second lower strap 38 (see FIG. 3) extending from a second longitudinal edge of the container. Hook and loop material 40 is secured to the lower straps 36 and 38 so as to permit selective securement of the first lower strap 36 to the second lower strap 38 when positioned about an arm of an individual. By this structure, the device 10 can be easily secured about an arm or other limb or cylindrical object as desired by an end user.

Figure 5:
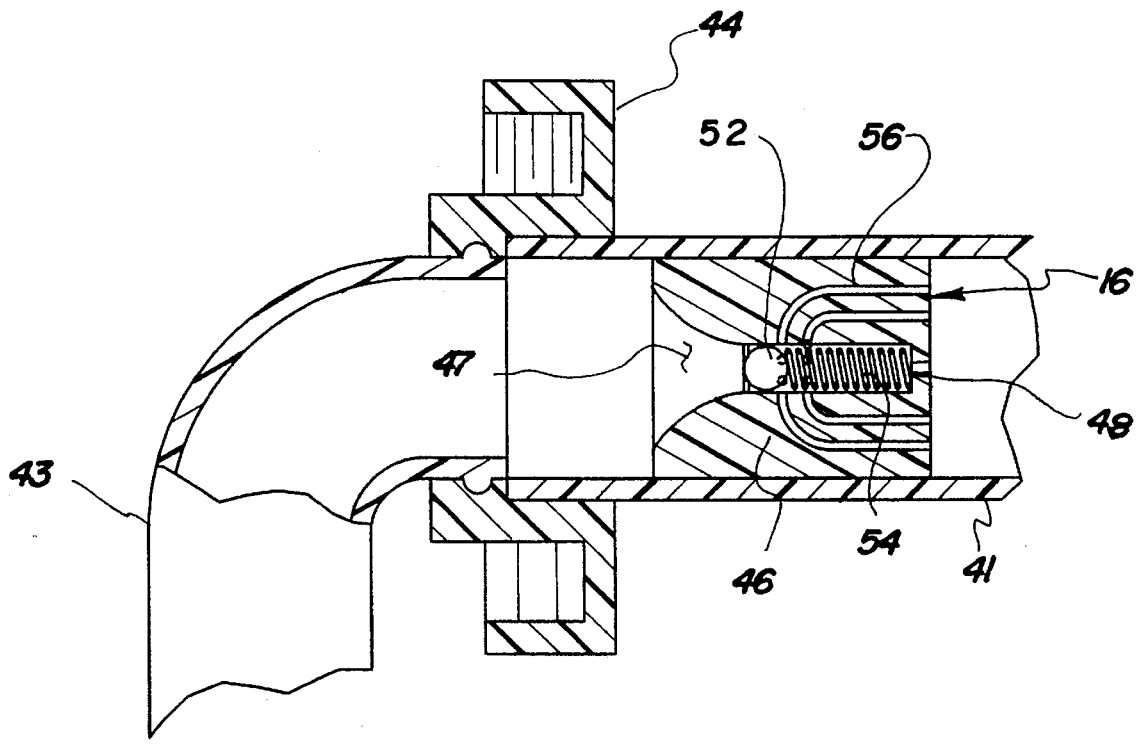
FIG. 5 is a cross sectional view taken along line 5—5 of FIG. 2 of a dispensing valve of the invention in a closed positioned.
Figure 6:
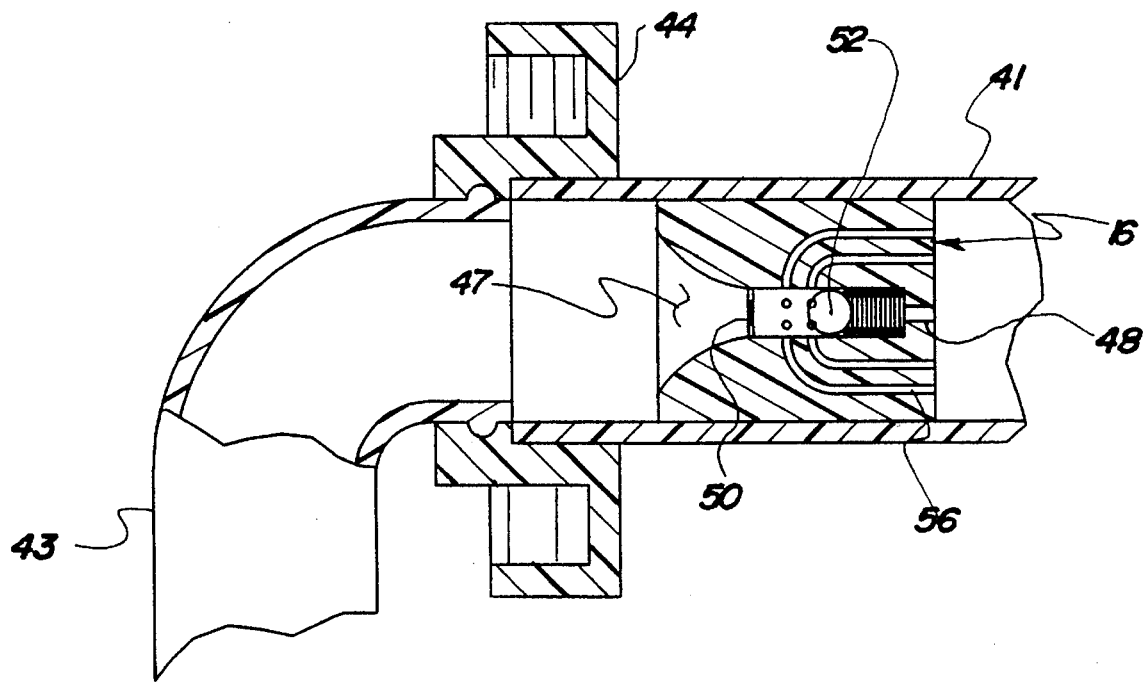
FIG. 6 is a cross sectional view of the dispensing valve in an open position.

As shown in FIGS. 1 and 2, the invention includes a supply conduit 41 which extends into the container 12 and preferably continues thereinto to couple with a dip tube 43 extending towards and proximal to the bottom wall 24 of the container. The dispensing valve 16 is mounted within the supply conduit 41 which is removably coupled relative to the container 12. To this end, a threaded neck 42 projects from the outer side wall 20 of the container 12 and is positioned over an aperture directed therethrough permitting fluid communication through the threaded neck 42 with the hollow interior 26 of the container 12. The supply conduit containing the dispensing valve 16 is thus threadably engaged to the threaded neck 42 so as to permit selective removal of the supply conduit 41, the dip tube 43, and the dispensing valve 16 as desired. Referring now to FIGS. 5 and 6 wherein the supply conduit 41, the dip tube 43, and the dispensing valve 16 are illustrated in detail, it can be shown that the device 10 includes a cap 44 having a threaded interior cooperatively threadably engaged to the threaded neck 42. The dip tube 43 includes an unlabeled annular projection extending therefrom which is slidably received within an unlabeled annular groove formed in the cap 44 so as to rotatably couple the dip tube 43 to the interior of the cap 44. The cap further includes an unlabeled cylindrical receiving bore directed thereinto within which the supply conduit 41 is frictionally or otherwise removably secured into. The supply conduit 41 projects from a front face of the cap 44 and is positioned in fluid communication with a hollow interior of the container 12 through the dip tube 43. By this structure, an individual can draw fluid through the dip tube 43 and the supply conduit 41 by simply creating a vacuum within the supply conduit 41 which actuates the dispensing valve 16 to permit fluid communication therethrough. Upon a termination of an application of vacuum to the supply conduit, the dispensing valve 16 will subsequently close to preclude accidental or unintentional dispensing of fluid from the container 12.

With continuing reference to FIGS. 5 and 6, it can be more particularly shown that the dispensing valve 16 comprises a manifold 46 positioned within the supply conduit 41. The manifold 46 is shaped so as to define a central bore 47 directed therethrough. The central bore 47 includes a reduced diameter portion defining a vacuum port 48 extending into fluid communication with a free distal end of the supply conduit 41. An apertured abutment plate 50 is mounted so as to extend transversely across an interior of the central bore 47 of the manifold 46 in a spaced orientation relative to the vacuum port 48. A sealing ball 52 is positioned within the central bore 47 and is normally biased into sealing engagement with the abutment plate 50 so as to preclude fluid communication thereacross. To this end, a spring 54 is interposed between the sealing ball 52 and a portion of the manifold circumscribing the vacuum port 48. A plurality of bypass ports 56 formed in the manifold 46 extend into communication with the central bore 47 between the abutment plate 50 and the vacuum port 48. The bypass ports 56 extend through the manifold 46 and into fluid communication with the free distal end of the supply conduit 41. By this structure, an application of a vacuum to the interior of the supply conduit 41 will result in a biasing of the sealing ball 52 towards the vacuum port 48 against a force of the spring 54 interposed therebetween. As the sealing ball is removed from the aperture in the abutment plate 50, fluid communication is permitted between the bypass ports 56 and the dip tube 43 through the central bore 47 of the manifold 46, thereby allowing an individual to drink from the container 12 through a manual suction of fluid therefrom while precluding unintentional dispensing from the container absent a vacuum being applied to the supply conduit 41.

In use, the arm supported drinking container 10 according to the present invention can be easily utilized to support a quantity of fluid relative to an arm or limb of an individual. The location and structure of the dispensing valve 16 permits and individual to easily consume a quantity of liquid from the hollow interior 26 of the container 12 as desired during a physical activity.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An arm supported drinking container comprising:

a container positionable against an exterior surface of a limb of an individual, the container comprises an arcuate inner side wall having a first radius of curvature and opposed longitudinal edges extending in a substantially parallel and spaced orientation, an outer side wall having a second radius of curvature substantially less than the first radius of curvature similarly includes opposed longitudinal edges extending in a substantially spaced and parallel orientation, the longitudinal edges of the inner side wall being sealingly secured to the longitudinal edges of the outer side wall, a top wall extending between the upper edges of the inner side wall and the outer side wall, and a bottom wall extending between the bottom edges of the inner side wall and the outer side wall;

an engaging pad secured to an interior surge of the inner side wall;

a securing means extending from the container circumferentially positioning about the container relative thereto, the securing means comprises a pair of upper straps and a pair of lower straps extending from opposed sides of the container which can be extended about a individual, the upper straps comprise a first upper strap secured to a first upper longitudinal edge of the container, a second upper strap secured to a second upper longitudinal edge of the container, hook and loop material secured to the upper straps so as to permit selective coupling of the first upper strap to the second upper strap when positioned about a limb of an individual, the lower straps comprise a first lower strap coupled to a first lower longitudinal edge of the container, a second lower strap extending from a second lower longitudinal edge of the container, hook and loop material secured to the lower straps so as to permit selective securement of the first lower strap to the second lower strap when positioned about the limb of the individual;

a dispensing valve mounted relative to the container and positioned in fluid communication with hollow interior of the container so as to permit selective dispensing of fluid therefrom for consumption by an individual;

a supply conduit removably mounted to an exterior of the outer side wall of the container, a dip tube extending into fluid communication with the supply conduit and projecting into the container to terminate proximal to the bottom wall thereof, the dispensing valve being positioned within the supply conduit, a threaded neck projects from the outer side wall of the container and is positioned over an aperture directed therethrough permitting communication through the threaded neck with the hollow interior of the container, a cap coupled to the supply conduit and the dip tube, the cap being threadably engaged to the threaded neck of the container, the dispensing valve comprises a manifold positioned within the supply conduit, the manifold being shaped so as to define a central bore directed therethrough, the central bore including a reduced diameter portion defining a vacuum port extending into fluid communication with a free distal end of the supply conduit, an apertured abutment plate mounted to the manifold so as to extend transversely across an interior of the central bore thereof in a spaced orientation relative to the vacuum port, a sealing ball positioned within the central bore and normally biased into sealing engagement with the abutment plate so as to preclude fluid communication thereacross, a plurality of bypass ports formed in the manifold and extending into fluid communication with the central bore between the abutment plate and the vacuum port, the bypass ports extending through the manifold and into fluid communication with the free distal end of the supply conduit, whereby an application of a vacuum to the interior of the supply conduit will result in a biasing of the sealing ball towards the vacuum port such that as the sealing ball is removed from the aperture in the abutment plate, fluid communication is permitted between the bypass ports and the dip tube through the central bore of the manifold.

2. The arm supported drinking container of claim 1, wherein the dispensing valve includes a spring interposed between the sealing ball and a portion of the manifold circumscribing the vacuum port.

3. The arm supported drinking container of claim 2, wherein the dispensing valve is mounted to an exterior of the outer side wall of the container and is oriented so as to reside laterally of a center axis directed longitudinally and medially between the opposed longitudinal edges of the inner and outer side walls.

4. The arm supported drinking container of claim wherein the dispensing valve is mounted to the exterior of the outer side wall of the container and is oriented so as to reside laterally of a center axis directed longitudinally and medially between the opposed longitudinal edges of the inner and outer side walls.

* * * * *